No. 730,959.

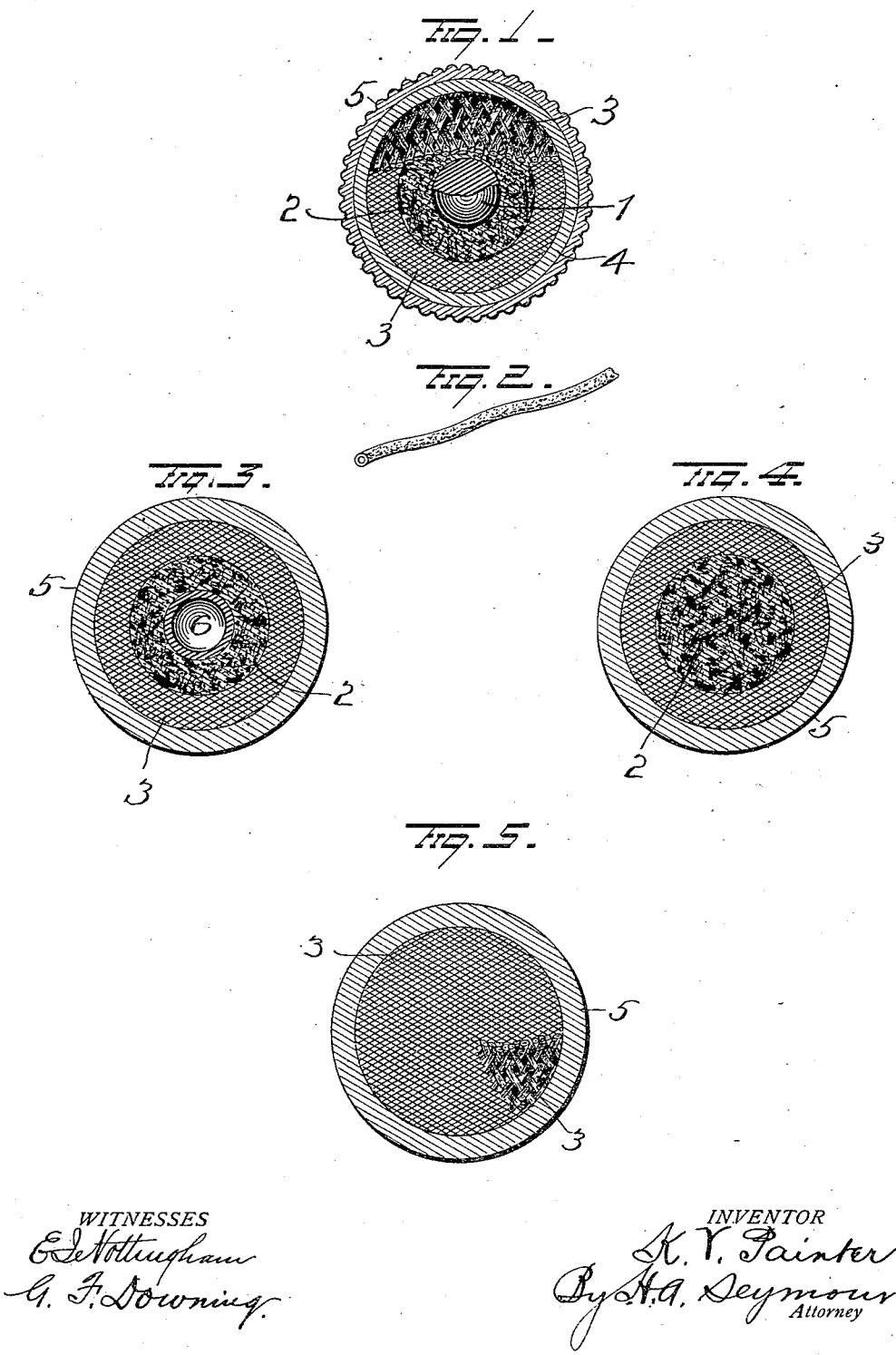

Patented June 16, 1903.

UNITED STATES PATENT OFFICE.

KENYON V. PAINTER, OF CLEVELAND, OHIO.

BALL.

SPECIFICATION forming part of Letters Patent No. 730,959, dated June 16, 1903.

Application filed March 19, 1903. Serial No. 148,590. (No model.)

*To all whom it may concern:*

Be it known that I, KENYON V. PAINTER, a resident of Cleveland, in the county of Cuyahoga and State of Ohio, have invented certain new and useful Improvements in Balls; and I do hereby declare the following to be a full, clear, and exact description of the invention, such as will enable others skilled in the art to which it appertains to make and use the same.

My invention relates to an improvement in balls, and more particularly to golf-balls and the like, the object of the invention being to provide a ball in which tubular rubber is employed either as a binder or core to provide an infinite number of air cells or compartments under high compression to impart great elasticity to the ball; and with this object in view the invention consists in certain novel features of construction and combinations and arrangements of parts, as will be more fully hereinafter described, and pointed out in the claims.

In the accompanying drawings, Figure 1 is a view in section, illustrating my improvements. Fig. 2 is a detail view of the tubular rubber employed; and Figs. 3, 4, and 5 are views of modifications.

1 represents a solid core of gutta-percha, celluloid, metal, paper, or other material inclosed in a covering 2 of porous rubber, and when the term "porous rubber" is employed it is to be understood that it is intended as a term broad enough to cover any form of rubber or composition thereof in which air cells or compartments are provided either by the nature of the rubber or by its manner of assembling. Around covering 2 tubular rubber 3, such as illustrated in the detail view, Fig. 2, is wound under high tension. This tubular rubber 3 may comprise a closed tube of cylindrical or other shape, or it might comprise a flat strip of rubber folded or curved longitudinally to form a tubular construction. The function of this tubular rubber is not only to hold the porous rubber under compression, but it also provides innumerable air chambers or compartments, which are under great compression to add to the elasticity and driving-power of the ball. The tubular rubber binder 3 is inclosed in a hard elastic casing or cover 4, of hard rubber or other suitable material, under great tension, and the casing or cover 4 is inclosed in an outer shell or cover 5 of gutta-percha, celluloid, paper, or other suitable material.

In Fig. 3 I have illustrated my improvements with a hollow spherical core 6 of elastic or inelastic material—such as rubber, celluloid, paper, gutta-percha, metal, or other material—and in this construction I dispense with the hard elastic casing or cover 4 and inclose the tubular binder 3 directly in the outer shell or cover 5.

In Fig. 4 I dispense altogether with an inner core and wind under high tension the tubular rubber 3 around the central filling of porous rubber and secure the outer shell or cover directly around the tubular binder 3.

In Fig. 5 I illustrate a ball in which the tubular rubber 3 is wound upon itself under high tension and the cover 5 secured directly thereon, dispensing with all parts save the tubular rubber and the outer shell or cover.

Other changes might be made without departing from my invention, and hence I do not confine myself to the precise details set forth, but consider myself at liberty to make such changes and alterations as fairly fall within the spirit and scope of my invention.

Having fully described my invention, what I claim as new, and desire to secure by Letters Patent, is—

1. A ball composed in part of rubber tubing.

2. A ball, composed of tubular rubber wound under high tension, and an outer cover or shell inclosing the same.

3. A ball, comprising a center of porous rubber, tubular rubber wound under high tension thereon to compress the porous rubber, and an outer shell or cover on said tubular rubber.

4. A ball, comprising a central core, tubular rubber wound thereon under high tension, and an outer shell or cover inclosing the same.

5. A ball, comprising a central core, porous rubber inclosing the same, tubular rubber wound around the porous rubber under high tension to compress the porous rubber, and an outer shell or cover inclosing the tubular rubber binder.

6. A ball, comprising a central core, porous rubber inclosing the same, tubular rubber wound around the porous rubber under high tension to compress the porous rubber, a hard elastic cover or casing around the tubular rubber under great tension, and an outer shell or covering around the casing.

7. A ball, comprising a central solid core of gutta-percha, porous rubber inclosing the same, tubular rubber wound under high tension around the porous rubber to hold the porous rubber under compression, a hard-rubber casing or cover inclosing the tubular rubber binder, and an outer shell or cover of gutta-percha.

In testimony whereof I have signed this specification in the presence of two subscribing witnesses.

KENYON V. PAINTER.

Witnesses:
S. W. FOSTER,
A. W. BRIGHT.